US012727656B2

(12) United States Patent
Haines

(10) Patent No.: US 12,727,656 B2
(45) Date of Patent: Sep. 8, 2026

(54) BACKPACK COVER

(71) Applicant: Daniel R. Haines, Mendham, NJ (US)

(72) Inventor: Daniel R. Haines, Mendham, NJ (US)

(73) Assignee: Daniel R. Haines, Mendham, NJ (US)

( * ) Notice: Subject to any disclaimer, the term of this patent is extended or adjusted under 35 U.S.C. 154(b) by 240 days.

(21) Appl. No.: 18/501,658

(22) Filed: Nov. 3, 2023

(65) Prior Publication Data

US 2024/0057748 A1 Feb. 22, 2024

Related U.S. Application Data

(62) Division of application No. 17/246,177, filed on Apr. 30, 2021, now Pat. No. 11,805,885.

(60) Provisional application No. 63/019,016, filed on May 1, 2020.

(51) Int. Cl.

| | |
|---|---|
| ***A45F 3/04*** | (2006.01) |
| ***A45F 3/00*** | (2006.01) |
| ***H02J 7/35*** | (2006.01) |
| ***H02S 30/20*** | (2014.01) |
| ***H02S 40/30*** | (2014.01) |

(52) U.S. Cl.

CPC .................. *A45F 3/04* (2013.01); *H02J 7/35* (2013.01); *H02S 30/20* (2014.12); *H02S 40/30* (2014.12); *A45F 2003/001* (2013.01); *A45F 2003/003* (2013.01)

(58) Field of Classification Search

CPC .......... H02S 30/00; H02S 30/20; H02S 40/30; A45F 3/04; A45F 5/155; A45F 5/1525; A45F 2003/001; A45F 2003/003; H10F 19/90–908

See application file for complete search history.

(56) References Cited

U.S. PATENT DOCUMENTS

| | | | | |
|---|---|---|---|---|
| 3,316,951 | A | 5/1967 | Jacobson | |
| 4,537,838 | A * | 8/1985 | Jetter | H10F 19/80 136/251 |
| 5,154,332 | A | 10/1992 | Williams et al. | |
| 6,024,264 | A | 2/2000 | Java | |
| 6,505,762 | B2 | 1/2003 | Wilfer | |
| 6,870,089 | B1 | 3/2005 | Gray | |
| D554,853 | S | 11/2007 | Bihn | |
| D650,576 | S | 12/2011 | Bertken | |

(Continued)

FOREIGN PATENT DOCUMENTS

| | | | |
|---|---|---|---|
| CN | 206150722 U | 5/2017 | |
| WO | WO-2011023741 A1 * | 3/2011 | E04D 5/06 |

OTHER PUBLICATIONS

WO-2011023741-A1 English machine translation (Year: 2011).*
CN 206150722 U English machine translation (Year: 2017).*

*Primary Examiner* — Andrew J Golden
(74) *Attorney, Agent, or Firm* — Venable LLP

(57) ABSTRACT

A backpack cover including (i) a shell having an opening and (ii) a band surrounding the perimeter and capable of securing the shell on a backpack. The backpack cover may be convertible and further include at least one pair of fasteners being capable of having a shoulder strap attached thereto and a zipper including a first set of teeth and a second set of teeth configured to engage with each other and close the opening. The backpack cover may also further include at least one solar panel and an output electrically connected, via a voltage converter to the solar panel.

18 Claims, 17 Drawing Sheets

(56) References Cited

U.S. PATENT DOCUMENTS

| | | | | |
|---|---|---|---|---|
| D737,046 | S | | 8/2015 | Robert |
| D809,300 | S | | 2/2018 | Babaian |
| 9,990,813 | B2 | | 6/2018 | Thiel |
| 10,086,895 | B1 | | 10/2018 | Melamed |
| 10,130,163 | B2 | | 11/2018 | Zhijian |
| 10,278,482 | B1 | | 5/2019 | McElveen et al. |
| 10,404,205 | B2 | | 9/2019 | Lillywhite et al. |
| 2005/0133558 | A1 | | 6/2005 | Toombs |
| 2005/0140331 | A1 | | 6/2005 | McQuade |
| 2006/0012331 | A1 | | 1/2006 | Gillette, II |
| 2006/0028166 | A1 | * | 2/2006 | Closset .................. H02S 40/38 320/101 |
| 2006/0273757 | A1 | | 12/2006 | Naguib |
| 2008/0210728 | A1 | | 9/2008 | Bihn |
| 2010/0180922 | A1 | * | 7/2010 | McKenna ............... H02S 30/20 135/96 |
| 2012/0137601 | A1 | * | 6/2012 | Peelman ................. H02S 20/00 52/173.3 |
| 2012/0225226 | A1 | | 9/2012 | Fikry |
| 2013/0312810 | A1 | * | 11/2013 | Hamaguchi ........... H10F 19/902 438/73 |
| 2018/0258882 | A1 | | 9/2018 | Thiel et al. |
| 2019/0109349 | A1 | | 4/2019 | Thiel et al. |
| 2020/0205554 | A1 | | 7/2020 | Deioma |
| 2020/0228056 | A1 | | 7/2020 | Miller |
| 2022/0408902 | A1 | | 12/2022 | Liesch |

* cited by examiner

BACKPACK COVER

CROSS-REFERENCE TO RELATED APPLICATIONS

This application is a divisional application of U.S. patent application Ser. No. 17/246,177, filed Apr. 30, 2021. U.S. patent application Ser. No. 17/246,177 claims the benefit under 35 U.S.C. § 119 (e) of U.S. Provisional Patent Application No. 63/019,016, filed May 1, 2020, and titled "Backpack Cover," the entirety of which is incorporated herein by reference.

FIELD OF THE INVENTION

The invention relates to a backpack cover, particularly a backpack cover that converts into a bag and a backpack cover with a portable charger using a solar panel.

BACKGROUND OF THE INVENTION

The use of battery powered devices such as mobile phones and laptops are prevalent. Users now depend on these devices in everyday life. As a result, such devices are frequently used, not just at home, but also away from home. It is not, however, always easy to find power to charge these devices, nor is it convenient to carry heavy supplemental charging batteries, especially when a user is engaging in an outdoor activity, such as hiking, biking, jogging, or outdoor labor. Finding power to charge such devices when engaged in these activities may be almost impossible. Portable power solutions suitable for use with these activities are thus desired to charge battery powered devices.

Backpacks with an integrated solar charging assembly lack versatility. Depending on circumstances, a user may want a light backpack to be worn as a standard backpack with shoulder straps or even a smaller rucksack that is portable. A user may also want to use a solar charging function with the backpacks the user already owns.

SUMMARY OF THE INVENTION

A non-limiting objective of the invention is to provide a convertible waterproof backpack with a solar charging assembly that can convert into multiple forms while still maintaining the solar charging function.

In one aspect, the invention relates to a convertible backpack cover including a shell made of waterproof material. The shell includes a back, a front, a top portion, and a bottom portion. The back has an opening and a perimeter surrounding the opening. The perimeter includes a first side and a second side opposite to the first side. The backpack cover also includes at least one pair of fasteners that are capable of having a shoulder strap attached thereto. The pair of fasteners include a top fastener on the top side of the shell and a bottom fastener on the bottom side of the shell. The backpack cover further includes a band surrounding the perimeter, and the band is capable securing the shell on the backpack. The backpack cover includes a zipper. The zipper includes a first set of teeth and a second set of teeth configured to engage with each other and close the opening. The first set of teeth is attached to the first side of the perimeter and the second set of teeth is attached to the second side of the perimeter.

In another aspect, the invention relates to a waterproof backpack cover including a shell made of waterproof material, a band, at least one solar panel, a voltage converter, and an output. The shell includes a back, a front, a top portion, and a bottom portion. The back side has an opening and a perimeter surrounding the opening. The band surrounds the perimeter and is capable of securing the shell on a backpack. The at least one solar panel is integrated into the front of the shell and configured to convert solar energy received by the solar panel to electricity. The voltage converter is electrically connected to the at least one solar panel and capable of converting the voltage of the electricity. The output is electrically connected to the voltage converter and capable of outputting the electricity to a device.

In a further aspect, the invention relates to a method of attaching a solar panel to a piece of fabric. The method includes applying a heat welding compound to at least one of an edge of a piece of fabric and an attachment section of a solar panel. The method also includes placing the attachment section of the solar panel against the piece of fabric with the heat welding compound sandwiched between the attachment section and the edge of the piece of fabric. The method further includes sewing through the edge of the piece of fabric to attach the solar panel to the piece of fabric and applying heat to weld the attachment section of a solar panel and the edge of the piece of fabric.

These and other objects, aspects, and advantages of the invention will become apparent from the following disclosure.

DETAILED DESCRIPTION OF THE PREFERRED EMBODIMENTS

FIGS. 1-13 show a backpack cover 100 according to a preferred embodiment of the invention. The backpack cover 100 can be converted into a stand-alone bag 128 and a rucksack (see FIGS. 6-10). The backpack cover 100 also includes a solar charging assembly 200. The following description will begin with an overall description of the backpack cover 100 followed by the description of the backpack cover 100 converted into a stand-alone bag 128 and a rucksack. Then, the solar charging assembly 200 integrated into the backpack cover 100 will be explained. Manufacturing steps of the backpack cover will be described next. Although these features are shown and described in combination herein, the features may be used separately. For example, the backpack cover 100 may be used without the solar charging assembly 200, and the solar charging assembly 200 herein may be used with a backpack cover 100 that does not convert into a stand-alone bag 128.

Figure 1:
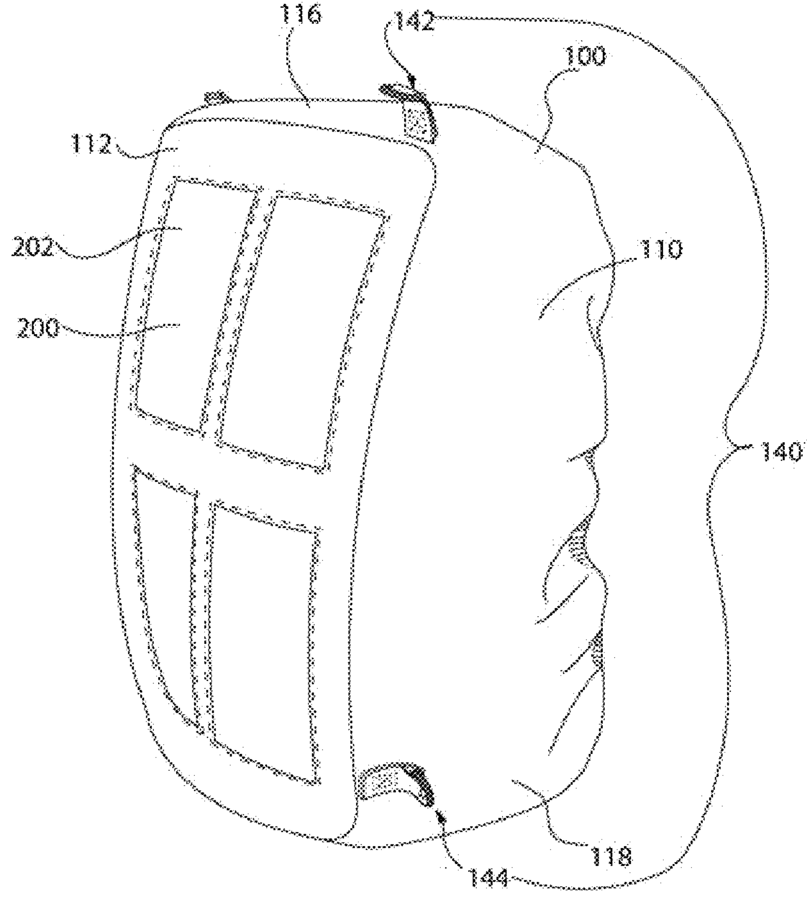
FIG. 1 is a perspective view of a front of a backpack cover according to a preferred embodiment.
Figure 2A:
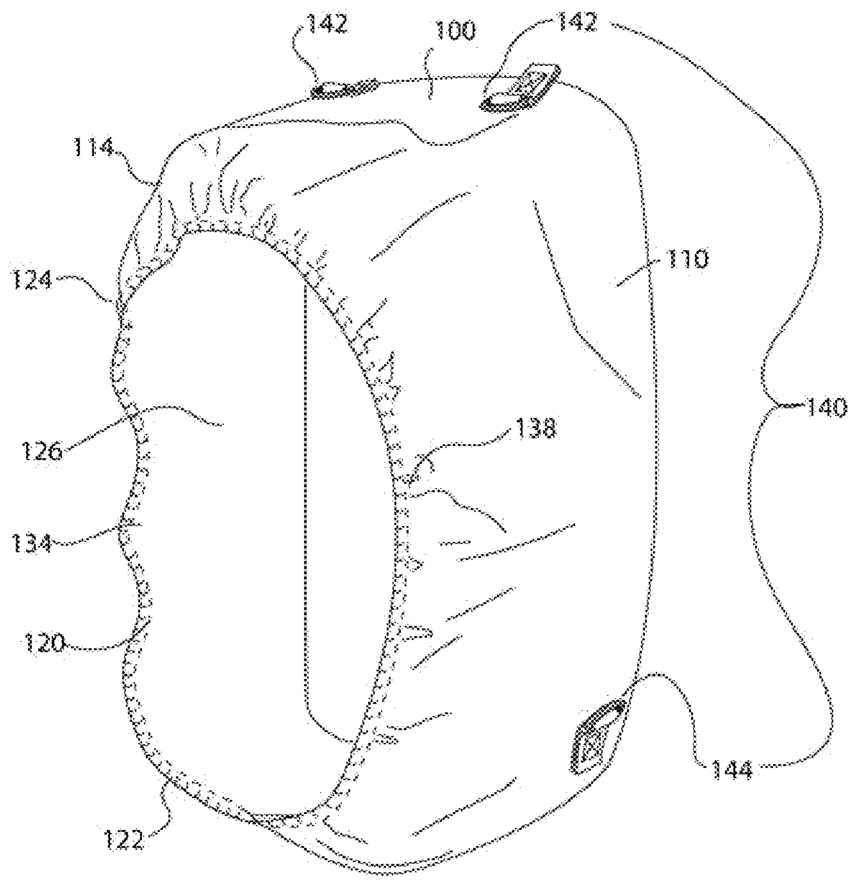
FIG. 2A is a perspective view of a back of the backpack cover shown in FIG. 1.
Figure 2B:
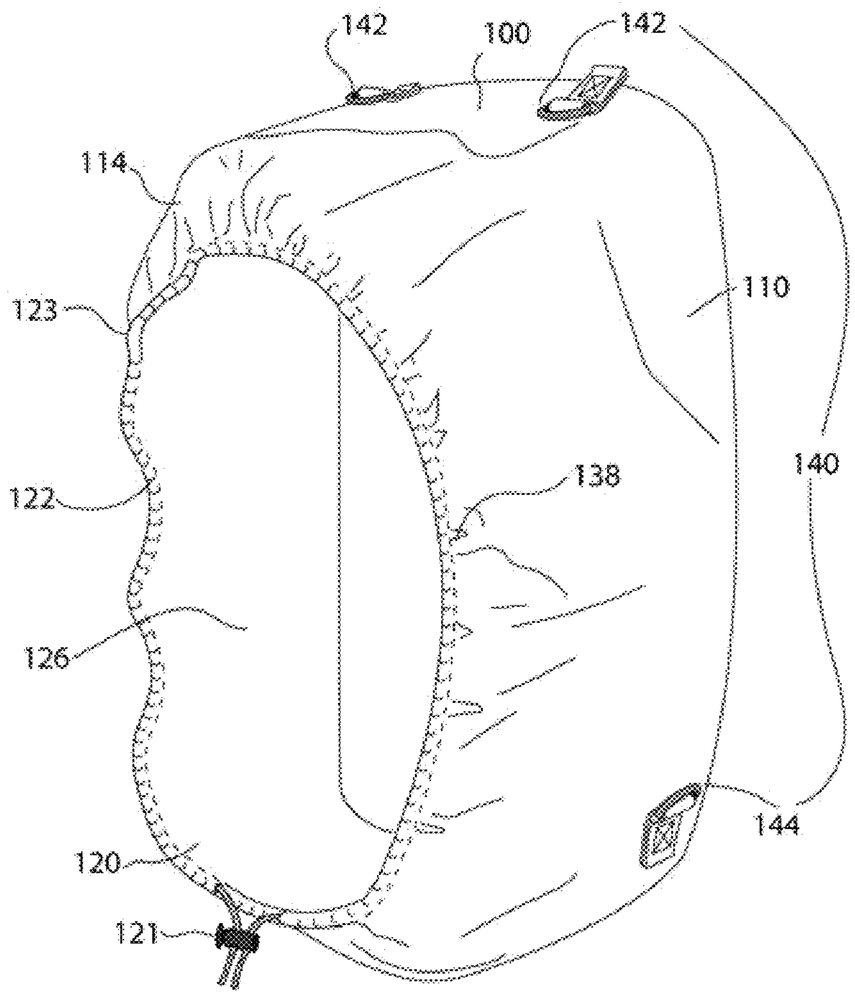
FIG. 2B is a perspective view of a back of the backpack cover shown in FIG. 1, with an alternative method of securing the backpack cover.
Figure 3:
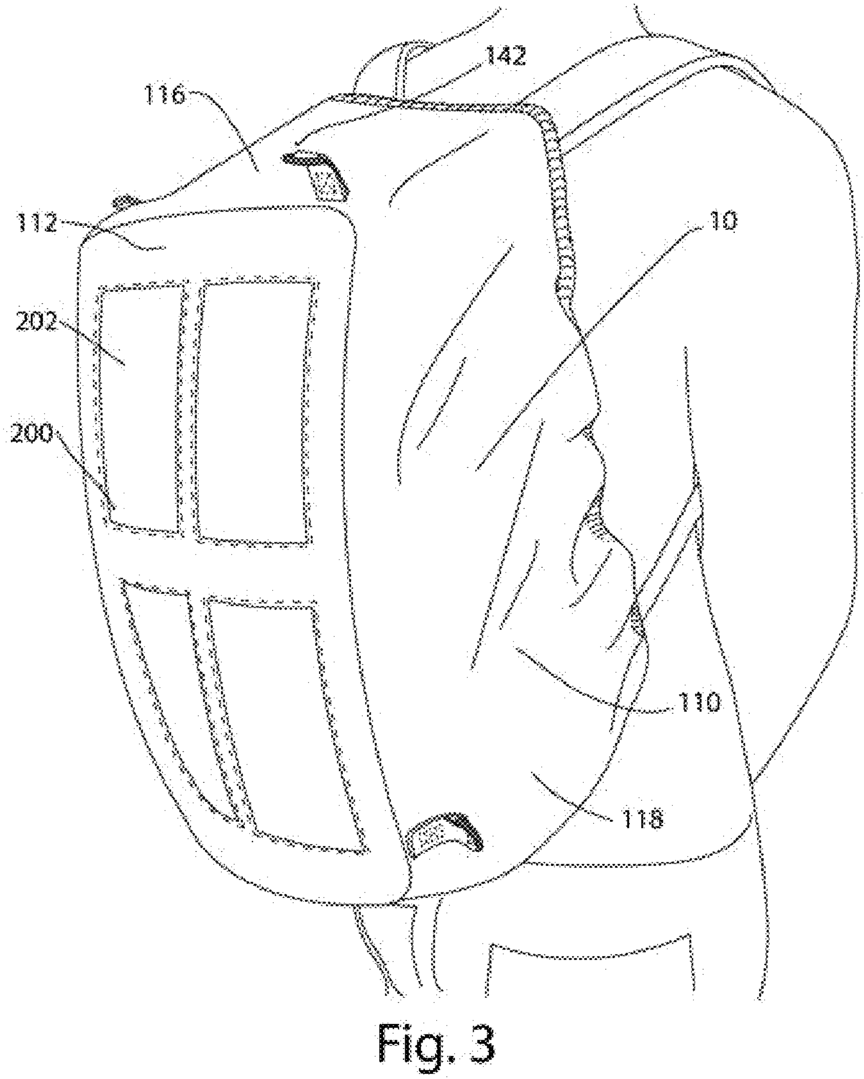
FIG. 3 shows a user wearing the backpack cover shown in FIG. 1 over a backpack.
Figure 4:
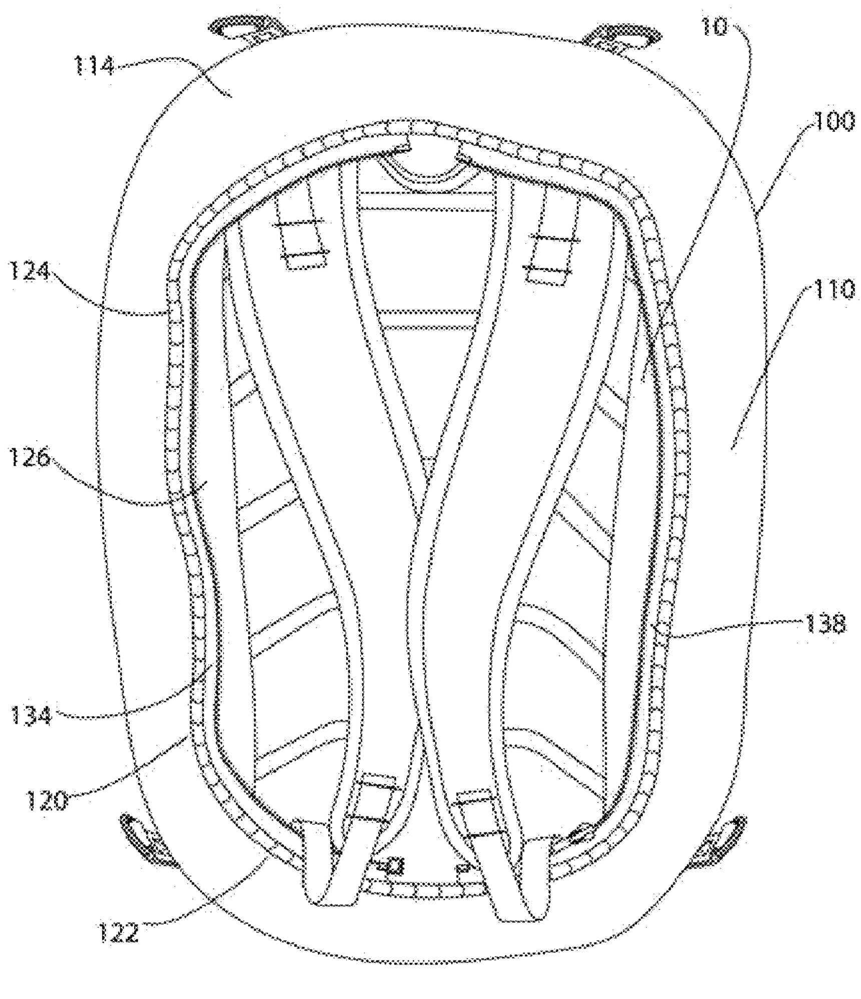
FIG. 4 is a perspective view of the back of the backpack cover shown in FIG. 1 on the backpack.

FIGS. 1 and 2 show the backpack cover 100 in a configuration where it can be worn on a regular backpack 10. FIG. 1 shows the front of the backpack cover 100, and FIG. 2A shows the back of the backpack cover 100. In FIGS. 1 and 2, the backpack 10 is omitted for clarity. FIGS. 3 and 4 show the backpack cover 100 over a conventional backpack 10. FIG. 3 shows a user wearing the backpack 10 and the backpack cover 100 over the backpack 10. FIG. 4 shows the back of the backpack cover 100 encompassing the backpack 10. The backpack cover 100 is configured to protect the backpack 10 from the elements, such as rain. The backpack cover 100 includes a shell 110 that is configured to enclose the backpack 10. Preferably, the shell 110 of this embodiment is waterproof, durable, tear-resistant, and yet lightweight. Any suitable fabric may be used as the shell, and one example of such suitable fabric is polyurethane coated nylon ripstop where the nylon is five hundred denier. The shell 110 has a front 112, a back 114, a top portion 116, a mid portion 113, and a bottom portion 118.

In this embodiment, the backpack cover 100 has a cavity 126 between the front 112 and the back 114 that the backpack 10 can fit in. To be compatible with most backpacks on the market, the front 112 and the back 114 of the backpack cover 100 have a rectangular shape, and the backpack cover 100 has a generally cuboidal shape. The shape of the backpack cover 100 and the shape of the front 112 and the back 114 may, however, be any suitable shape. When worn on the backpack 10, the front 112 covers the front side of the backpack 10 and the back 114 covers the back side of the backpack 10. To fit the backpack 10 into the cavity 126 in the backpack cover 100, the back of the backpack cover 100 has an opening 120.

The opening 120 is configured to safely secure the backpack cover 100 on the backpack 10. As shown in FIG. 2A, the opening 120 has a perimeter 122 and an elastic band 124 in the perimeter 122 surrounding the opening. In this embodiment, the elastic band 124 is enclosed within a tube of fabric that forms the perimeter 122 of the opening 120. The elastic band 124 has a normal or relaxed shape and length. The elastic band 124 and opening 120 may be expanded to a first expanded length so that the backpack 10 can be pushed through the opening 120 and into the cavity 126. When the backpack 10 is placed in the cavity 126 of the backpack cover 100, the elastic band 124 contracts enclosing the backpack 10 in the cavity 126 with the straps 12 of the backpack 10 extending through the opening 120. The back 114 of the backpack cover 100 surrounds an outer edge of the backpack, and the elastic band 124 is expanded to a second expanded length from its relaxed length to secure the backpack cover 100 on the backpack, as shown in FIG. 4. The second expanded length is shorter than the first expanded length.

Although this preferred embodiment shows a backpack cover 100 with an elastic band 124, other features may be used to secure the backpack cover 100 on the backpack. As shown in FIG. 2B, for example, a non-elastic cord 123 instead of elastic band 124 may be used. The perimeter 122 can be designed to have an opening for a non-elastic cord to be pulled through. A length of non-elastic cord within the perimeter 122 may be adjusted so that the opening 120 can expand and contract to enclose a backpack. A lock, such as spring-loaded cord lock 121 or plastic twist lock, may be used with the non-elastic cord within the perimeter 122. The lock may be used to secure the non-elastic cord at a desired length. Although described with a non-elastic cord 123, such a lock may also be used with an elastic cord 123 or elastic band 124.

Figure 5:
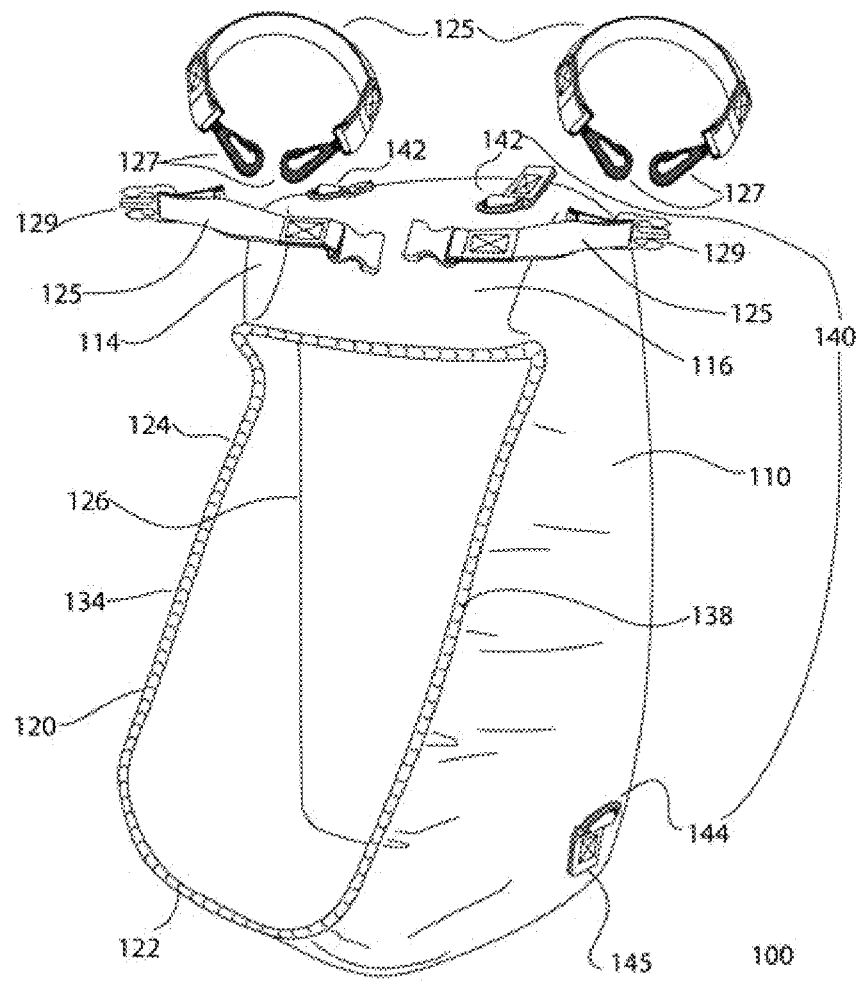
FIG. 5 is a perspective view of the front of the backpack cover to be worn on a slanted backpack.

The backpack cover 100 may have additional features that are used to safely secure the backpack cover 100 on the backpack 10. These additional features include a pair of straps 125 (short straps 125), as shown in FIG. 5. The short straps 125 may be especially useful to secure the backpack cover 100 on a slanted backpack.

The pair of short straps 125 connect to the top portion 116 of the backpack cover 100 with one on the left side and one on the right side of the backpack cover 100. The pair of short straps 125 are configured to wrap around shoulder straps of the backpack 10. The pair of short straps 125 thus connect the top portion 116 of the backpack cover 100 to the backpack 10 and prevent the top portion 116 of the backpack cover 100 from falling off of a slanted backpack. The pair of short straps 125 may be completely detachable from or attached to the top portion 116 of the backpack cover 100. In this embodiment, the pair of straps 125 are completely detachable. In this embodiment, each short strap 125 has two ends. A connector is attached to each of the two ends of the short strap 125. Any suitable connector may be used, but in this embodiment the connector is a swivel eye hook 127. For each short strap 125, a swivel eye hook 127 on one end can be engaged with one of the top fasteners 142. The top fastener 142 is discussed further below, but in this embodiment, it is a D-ring sewn into the top portion 116 of the backpack cover 100. A swivel eye hook 127 on the other end can be engaged with the same top fastener 142 after the short strap 125 is wrapped around a shoulder strap of the slanted backpack.

The short straps 125 may also be connected to the top portion 116 of the backpack cover 100. For example, the short straps 125 may be sewn on to the top portion 116 of the backpack cover 100. A suitable connector for two ends of each short strap 125 may be side press buckles 129.

Figure 6:
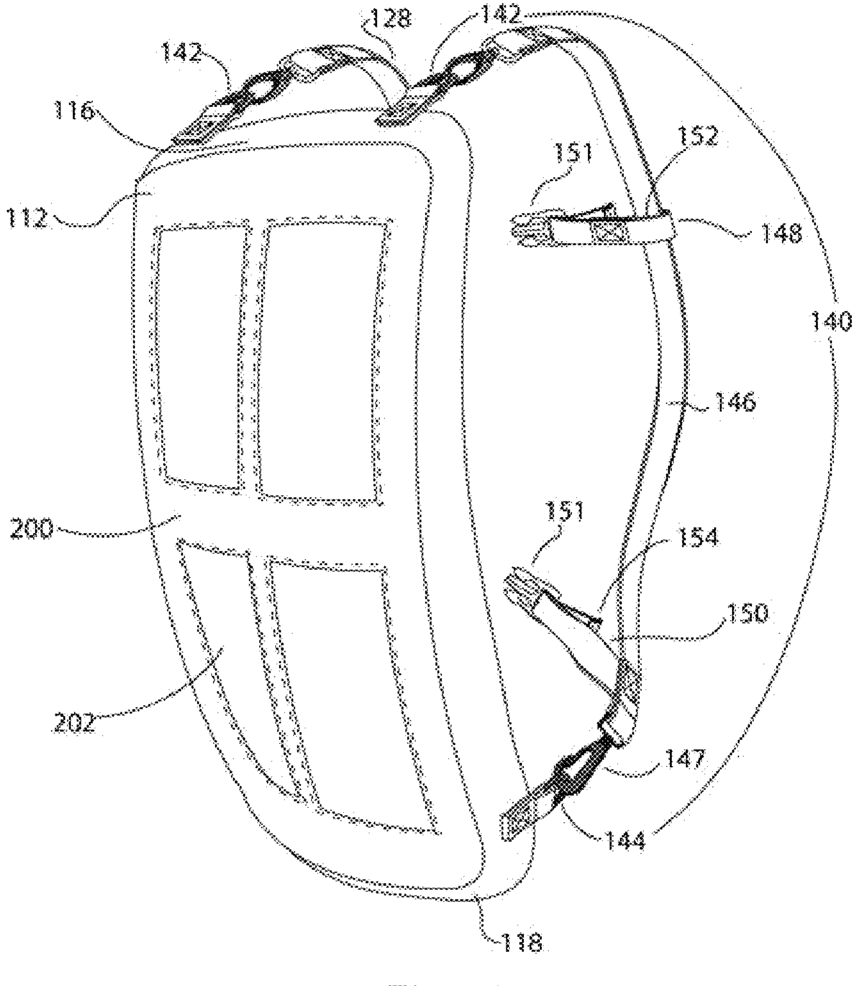
FIG. 6 shows the front of the backpack cover shown in FIG. 1 converted into a stand-alone bag, with shoulder straps attached to it.

The backpack cover 100 of this embodiment is a convertible backpack cover 100 and can be converted into a stand-alone bag 128. When only a lightweight backpack is desired, the backpack cover 100 may be used as the stand-alone bag 128. FIG. 6 shows the backpack cover 100 in FIG. 1 converted into the stand-alone bag 128. Preferably, the stand-alone bag 128 is sized such that it has a volume between 50 liters and 150 liters.

Figure 7:
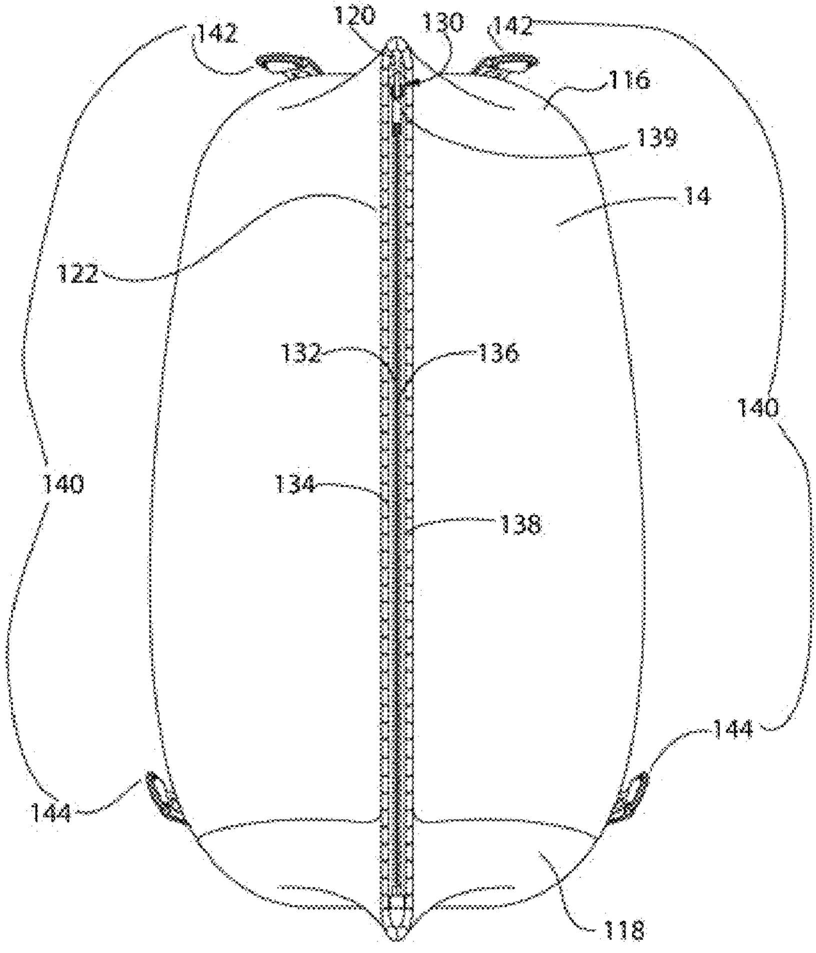
FIG. 7 shows the back of the backpack cover shown in FIG. 1 converted into a stand-alone bag.
Figure 8:
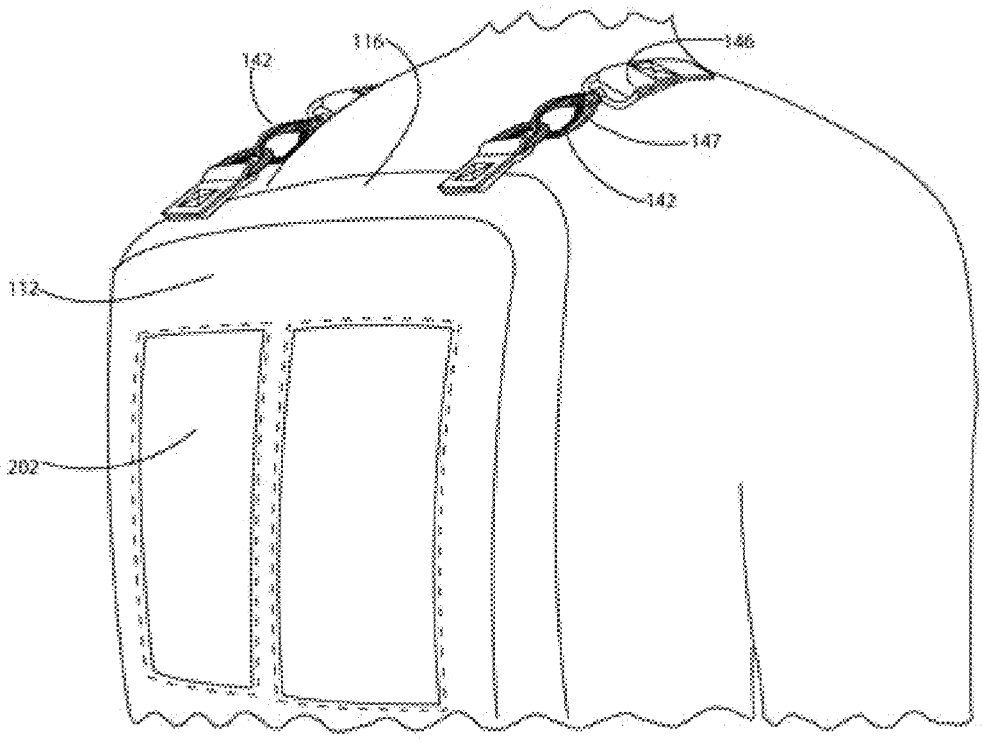
FIG. 8 is the top of the stand-alone bag shown in FIG. 6.
Figure 9:
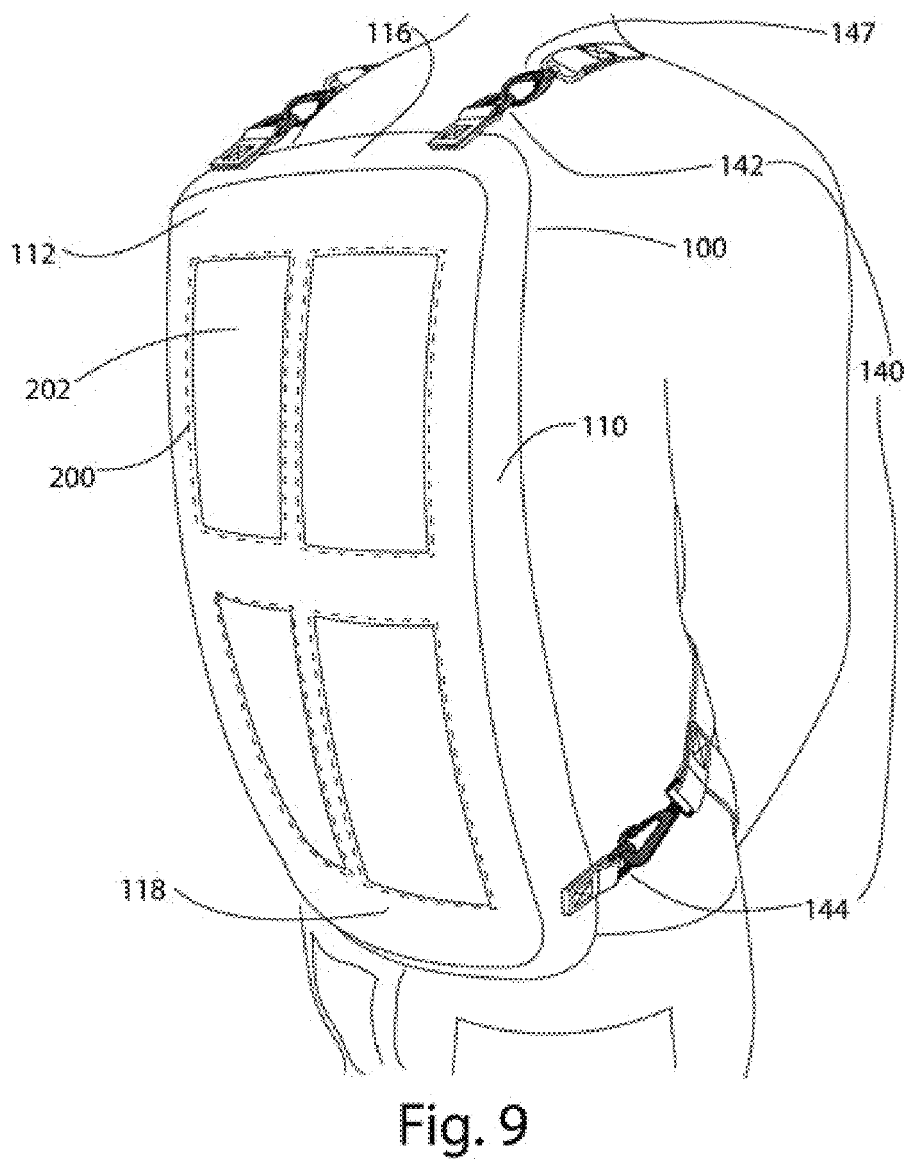
FIG. 9 shows a user wearing the stand-alone bag.

When used as the stand-alone bag 128, the opening 120 of the backpack cover 100 may be closed. FIG. 7 shows the back 114 of the backpack cover 100 when the opening 120 is closed. By closing the opening 120, the cavity 126 that was used for encompassing a backpack can be used as a storage compartment. In this embodiment, a zipper 130 is used to close the opening 120 of the backpack cover 100. A first set of teeth 132 of the zipper 130 is attached to a first side 134 of the perimeter 122, and a second set of teeth 136 of the zipper 130 is attached to a second side 138 of the perimeter 122. The second side 138 of the perimeter 122 is opposite to the first side 134 of the perimeter 122. In this embodiment, the first side 134 and the second side 138 are located vertically on the two longest sides of the perimeter 122. The first set of teeth 132 and the second set of teeth 136 are configured to engage with each other to close the opening. When the teeth 132, 136 of the zipper engage with each other, they close the opening 120 vertically along the middle of the backpack cover 100, as shown in FIG. 7. A slider 139 may be used to engage and disengage the teeth 132, 136.

Additionally, when used as the stand-alone bag 128, the stand-alone bag 128 may be worn on the back. The shell 110 includes at least one pair of fasteners 140 to which a shoulder strap 146 can be attached. As shown in FIG. 6, the shell 110 of this embodiment includes two pairs of fasteners 140, but any suitable number of fasteners 140 may be used. Each pair of fasteners 140 includes a top fastener 142 on the top portion 116 of the shell 110 and a bottom fastener 144 on the bottom portion 118 of the shell 110. A top end of the shoulder strap 146 is attached to the top fastener 142 and a bottom end of the shoulder strap 146 is attached to the bottom fastener 144. Any suitable fastener may be used as the top fastener 142 and bottom fastener 144, but in this embodiment, each fastener 142, 144 is a D-shaped ring that is sewn by a fabric strap 145 to the top portion 116 and bottom portion 118 of the shell 110, respectively.

In this embodiment, the shoulder straps 146 are removably attached to the stand-alone bag 128. Each shoulder strap 146 is attached to the top fastener 142 and the bottom fastener 144 using a swivel eye snap hook 147. However, any suitable connector can be used to attach a shoulder strap 146 to the top fastener 142 and bottom fastener 144. The connector used in this embodiment is preferably one that can be detachably engaged with the corresponding fastener 142, 144 such that the shoulder strap 146 can be removed when the convertible backpack cover 100 is being used to cover a backpack. Preferably, shoulder straps 146 have shoulder pads for comfort.

The shoulder straps 146 may also have a pair of chest straps 148 and a pair of waist straps 150 that can be worn across the body, as shown in FIG. 6. These additional straps such as chest strap 148 and waist strap 150 may be useful when the stand-alone bag 128 is used for outdoor activities such as hiking to secure the stand-alone bag 128 tightly on one's back. The pair of chest straps 148 are configured to lay across one's chest horizontally. The pair of waist straps 150 are configured to lay across one's waist horizontally.

In this embodiment, one end of each chest strap 148 or waist strap 150 is attached to the shoulder strap 146. Each chest strap 148 is attached to a top part 152 of each shoulder strap 146. Each waist strap is attached to a bottom part 154 of each shoulder strap 146. The pair of chest straps 148 and the pair of waist straps 150 may be attached to the shoulder straps 146 using any suitable methods, such as sewing or using detachable clips.

In this embodiment, the other end of each chest strap 148 or waist strap 150 has a connector. Any suitable connector may be used, but in this embodiment side press buckles 151 are used. A user may adjust the length of the chest strap 148 or waist strap 150 according to the user's body measurement using side press buckles 151. The pair of chest straps 148 and the pair of waist straps 150 can be closed in the middle section of the body using the side press buckles 151.

The backpack cover 100 of this embodiment can be further converted into a rucksack. When a smaller backpack than the stand-alone bag 128 is desired, the backpack cover 100 may be used as a rucksack. Preferably, the rucksack is sized such that it has a volume under 30 liters.

Figure 10:
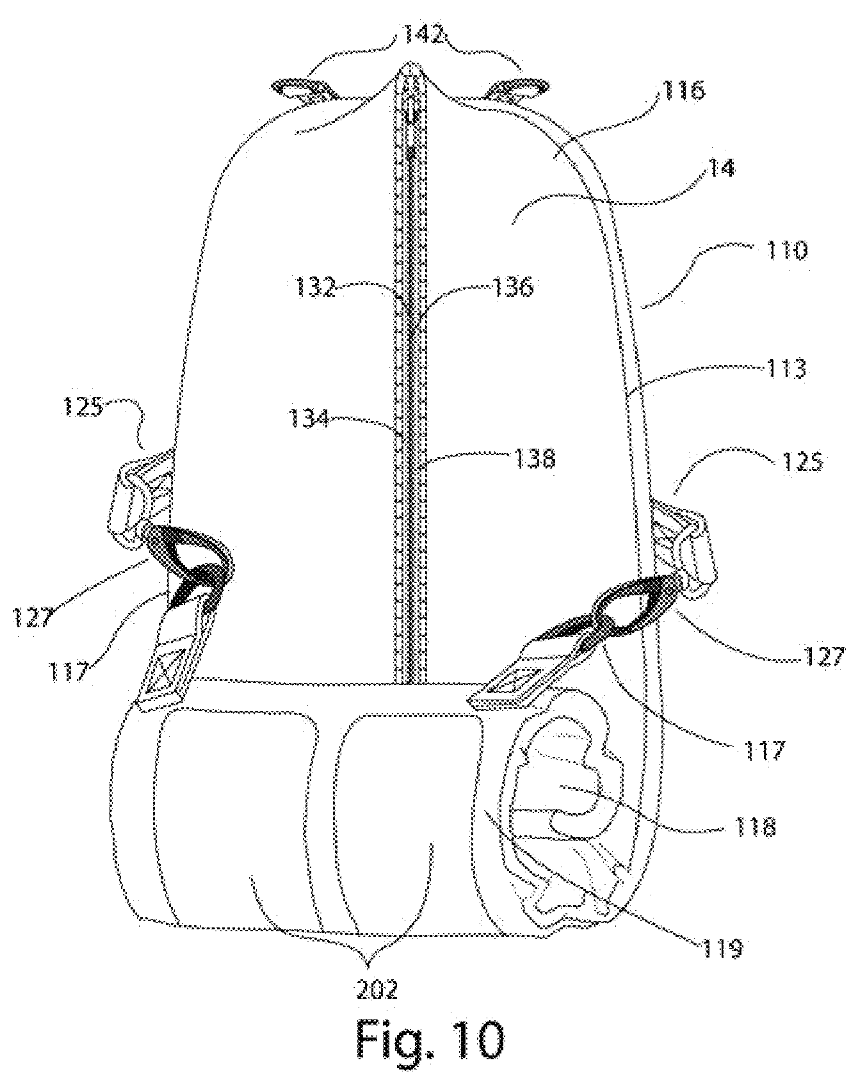
FIG. 10 shows the back of the backpack cover shown in FIG. 1 to be converted into a rucksack.

To be used as a rucksack, the stand-alone bag 128 shown in FIG. 7 may be reshaped. For example, the bottom portion 118 of the shell 110 may be rolled up to form a roll 119, and the roll 119 is secured to the shell 110. As shown in FIG. 10, for example, the roll 119 is secured to the mid portion 113 of the shell 110, but the roll 119 may be secured to other portions of the shell 110, including but not limited to the top portion 116 of the shell. Any suitable means of securing the rolled-up bottom portion 118 may be used, such as a side squeeze buckle, Velcro, or D-rings. For example, when a side squeeze buckle is used, a part of a side squeeze buckle may be attached to the middle of the bottom portion 118 of the shell 110 and the other part may be attached to the top portion 116 of the shell 110. When the bottom portion 118 of the shell 110 is rolled up to form the roll 119, the part of a side squeeze buckle attached to the bottom portion 118 of the shell 110 can meet with the other part attached to the top portion 116 of the shell 110 and the two portions engaged with each other to secure the roll 119 to the shell 110 and form a rucksack. Alternatively, when D-rings are used, a pair of short straps, like the short straps 125 shown in FIG. 5, may be used to secure the roll 119 to the shell 110. In this example, a pair of D rings 127 is attached to the bottom portion 118 of the shell 110 and the pair of short straps is attached to the mid portion 113 of the front 112 of the shell 110 as shown in FIG. 10. When the bottom portion 118 of the shell 110 is rolled up to form the roll 119, a swivel eye hook 127 on one end of each short strap 125 is engaged with D ring 117 attached to the bottom portion 118 to secure the rolled-up backpack cover 100 to be a rucksack.

As discussed above, the backpack cover 100 of this embodiment includes a solar charging assembly 200. The solar charging assembly 200 provides users an option to charge electrical devices without having to carry heavy batteries around or to find an electrical outlet to charge. The backpack cover 100 with integrated solar charging assembly 200 will be described with reference to FIGS. 1-6, 9 and 11-13.

The solar charging assembly 200 includes at least one solar panel 202. In this embodiment, the backpack cover 100 includes a plurality of solar panels 202. Any suitable number of solar panels 202 may be used, but the backpack cover shown in FIG. 1 includes four solar panels 202 located on the front 112 of the shell 110. In the present embodiment, the backpack cover 100 provides a versatile charging solution to the users because the solar panels 202 are conveniently located on the front 112 of the shell. Users can charge their electronic devices while wearing the backpack cover 100 as a cover on a regular backpack or as the stand-alone bag 128. Users may also charge their devices by laying, placing, or attaching the backpack cover 100 anywhere and positioning the solar panels 202 to face the sun.

As will be discussed further below, the solar panels 202 are integrated into the waterproof fabric of the shell 110. In this embodiment, solar panels 202 of the solar charging assembly 200 receive solar energy and convert it to electricity. Preferably, solar panels 202 are thin, rugged, durable, and water-resistant on its surface, such as a copper-indium-galliumselenide solar cell (CIGS). This type of solar panel can include an ethylene tetrafluoroethylene (ETFE) substrate with filleted corners. However, any suitable model may be used.

Figure 11:
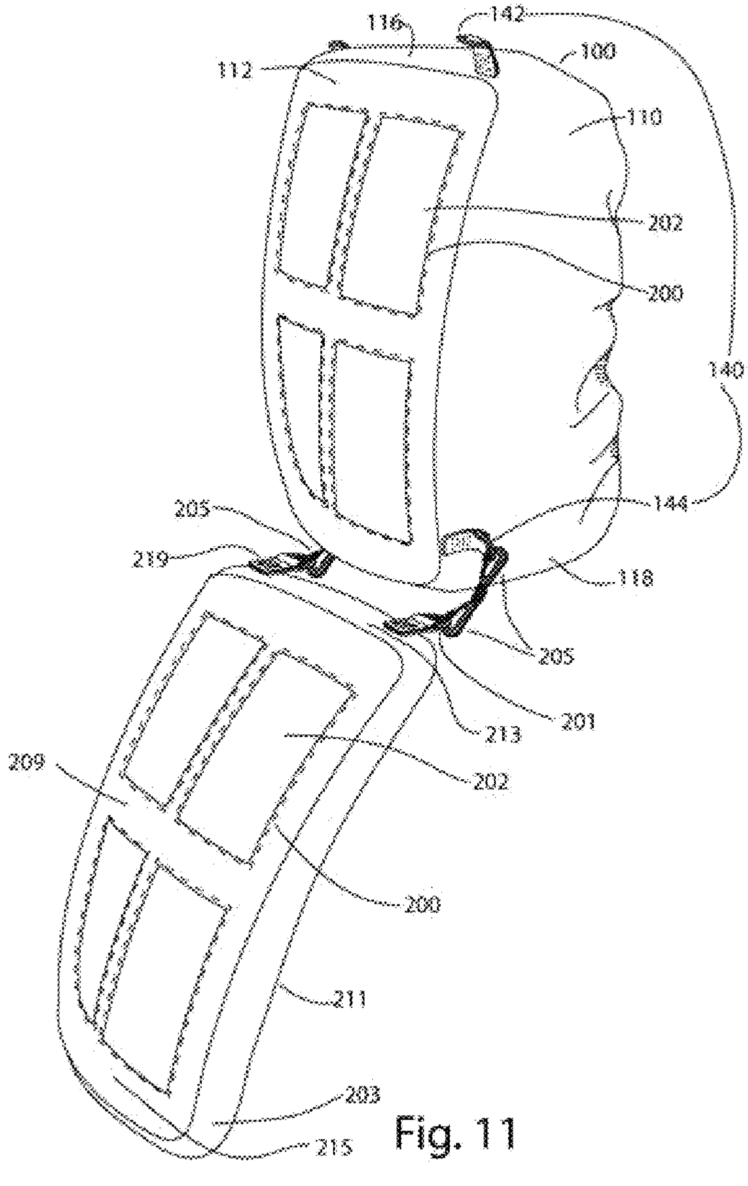
FIG. 11 shows the front of the backpack cover shown in FIG. 1, with a solar flap attached to it.

Traditional backpacks have multiple compartments which limit the surface area that can be used for solar panels. The backpack cover 100 of this embodiment does not have such compartments and thus does not have such limitations. Instead, the full front surface of the backpack cover 100 may be used for solar panels 202. Thus, sufficient solar panels 202 may be incorporated into the backpack cover 100 to provide a sufficient wattage and amperage to charge today's high demand mobile devices. In a further embodiment, additional solar panels 202 may be added as a deployable solar flap 203 to the bottom portion 118 of the backpack cover 100 to maximize the charging capability. FIG. 11 shows the backpack cover 100 with the solar flap 203. The solar flap 203 has a front 209, a back 211, a top portion 213, and a bottom portion 215. Additional solar panels 202 may be added to the front 209 of the solar flap 203. The front 209 of the solar flap 203 may be of any suitable size, but in this embodiment, the front 209 is the same size as the front 112 of the shell 110. Further, the solar flap 203 may have a rectangular shape or any other suitable shape. Preferably, the solar flap 203 of this embodiment is waterproof, durable, tear-resistant, and lightweight. Any suitable material may be used for the solar flap 203, such as polyurethane coated nylon ripstop where the nylon is five hundred denier. The solar flap 203 may also have at least one pair of fasteners 201. Fasteners 201 such as a D-shaped ring may be sewn by a fabric 219 to the top portion 213 of the solar flap 203. The solar flap 203 may be added to the shell 110 using the bottom fasteners 144 of the shell 110 and connectors. Any suitable connector, such as a swivel eye hook 205, may be used to connect the fastener 201 of the solar flap 203 and the fasteners 144 of the shell 110. The solar flap 203 may be rolled up from the bottom portion 215 and secured at the top portion 213. Any suitable means of securing the rolled-up bottom portion 215 may be used, such as a side squeeze buckle, Velcro, or rings with clips.

To convert an electrical energy input into a desirable voltage output, the solar charging assembly 200 also includes a voltage converter 204. The voltage converter 204 may be used to adjust the output to charge electrical devices. Preferably the output will be adjusted from 1 volt to 60 volts, from 0.01 amps to 60 amps, and/or from 0.01 watts to 200 watts. The voltage converter 204 is connected to the solar panels 202 through wiring 206.

Figure 12A:
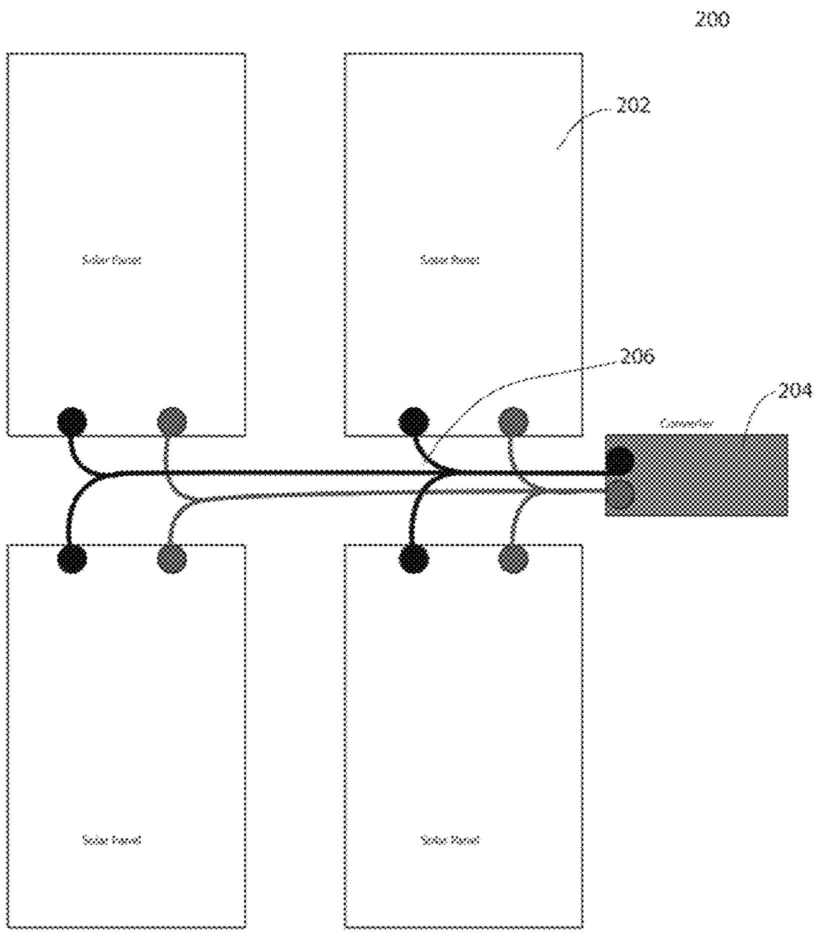
FIGS. 12A, 12B, 12C, and 12D are electrical diagrams of solar assemblies that may be used with the backpack cover shown in FIG. 1.
Figure 12B:
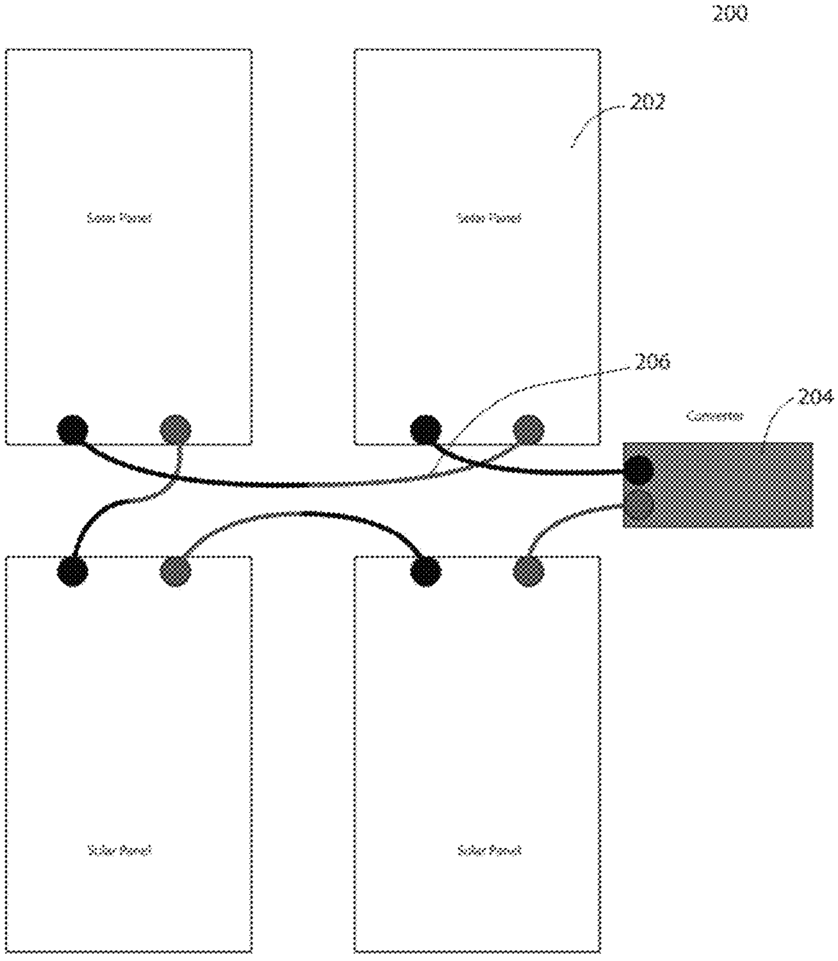
Figure 12:
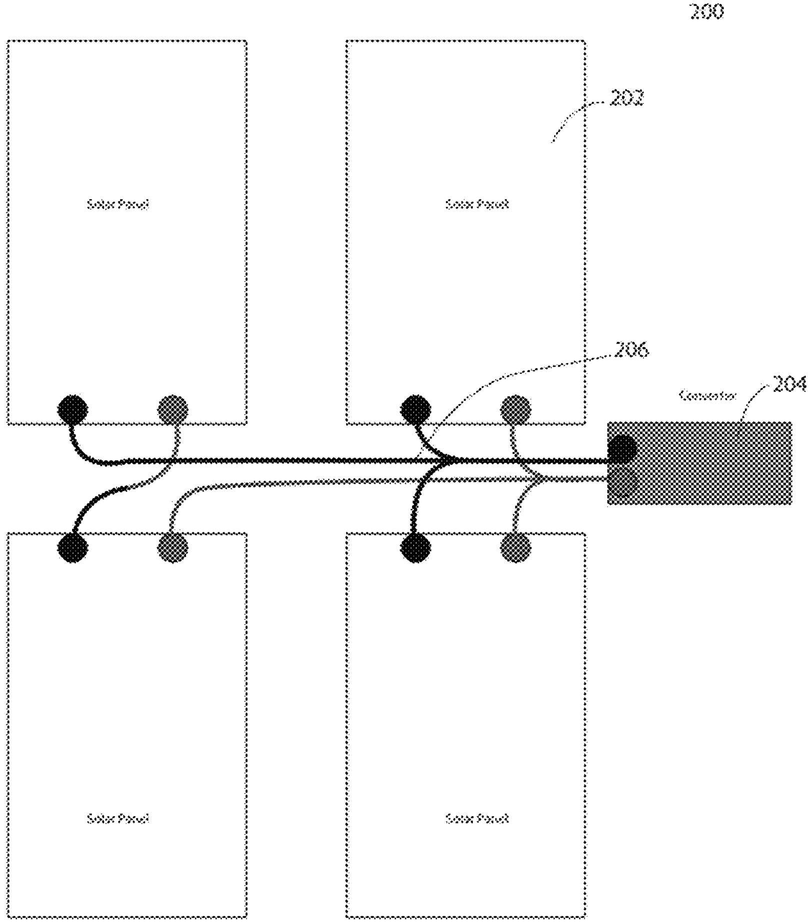
Figure 12D:
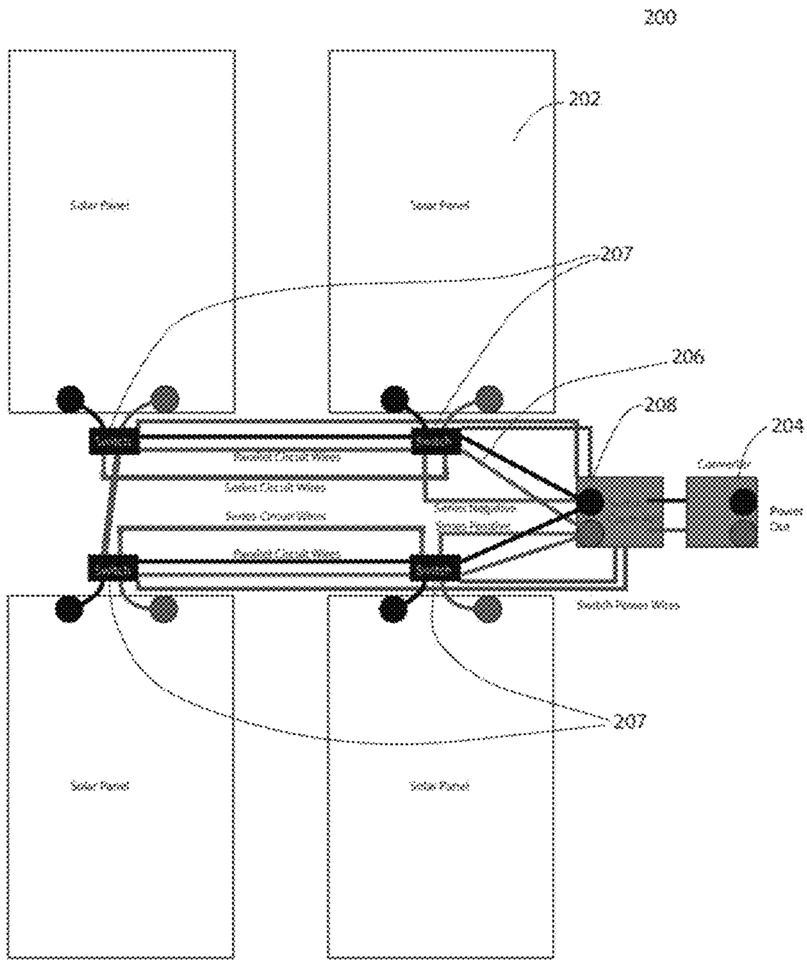

The wiring 206, which connects solar panels 202 to the voltage converter 204 determines the performance of the output of the solar panels 202 into the voltage converter 204. The solar panels 202 may be wired in parallel (FIG. 12A), series (FIG. 12B), in a combination of both (FIG. 12C), or with variable wiring (FIG. 12D) based on the intended use. The voltage converter 204 may additionally have a switch controller 208. The switch controller 208 may be placed on the exterior of the voltage converter 204 and regulate configuration of the wiring 206 in a variable wiring configuration, such as that shown in FIG. 12D. Any small microcontroller board such as the Arduino Nano from Arduino may be used as the switch controller 208. As shown in FIG. 12D, a plurality of switches 207 may be added to the wiring 206 to regulate the configuration of the wiring 206. Suitable models include any logic level MOSFET such as IRLZ34NPbF from Infineon or 2N6387 from On Semiconductor.

A physical chip may be integrated into the voltage converter 204 to regulate a voltage output from the voltage converter 204. Preferably, a chip which is programmed with several fast charging protocols for smart devices, as well as a wide array of protocols for a variety of devices may be used. The solar charging assembly 200 further includes an output to charge external devices. The output is electrically connected to the voltage converter 204. Any suitable electrical output may be used, including, for example, an output jack, such as a USB-C port or a Lightning Port, or wireless charging.

One function of the backpack cover 100, whether used as a light backpack or as a backpack cover, is to provide protection to the backpack 10 or other contents stored in the convertible backpack cover 100. Thus, the backpack cover 100 of this embodiment has durable and waterproof seal formed around the solar panels. In the following section, the manufacturing process of the backpack cover 100 as in the present embodiment is described.

Figure 13:
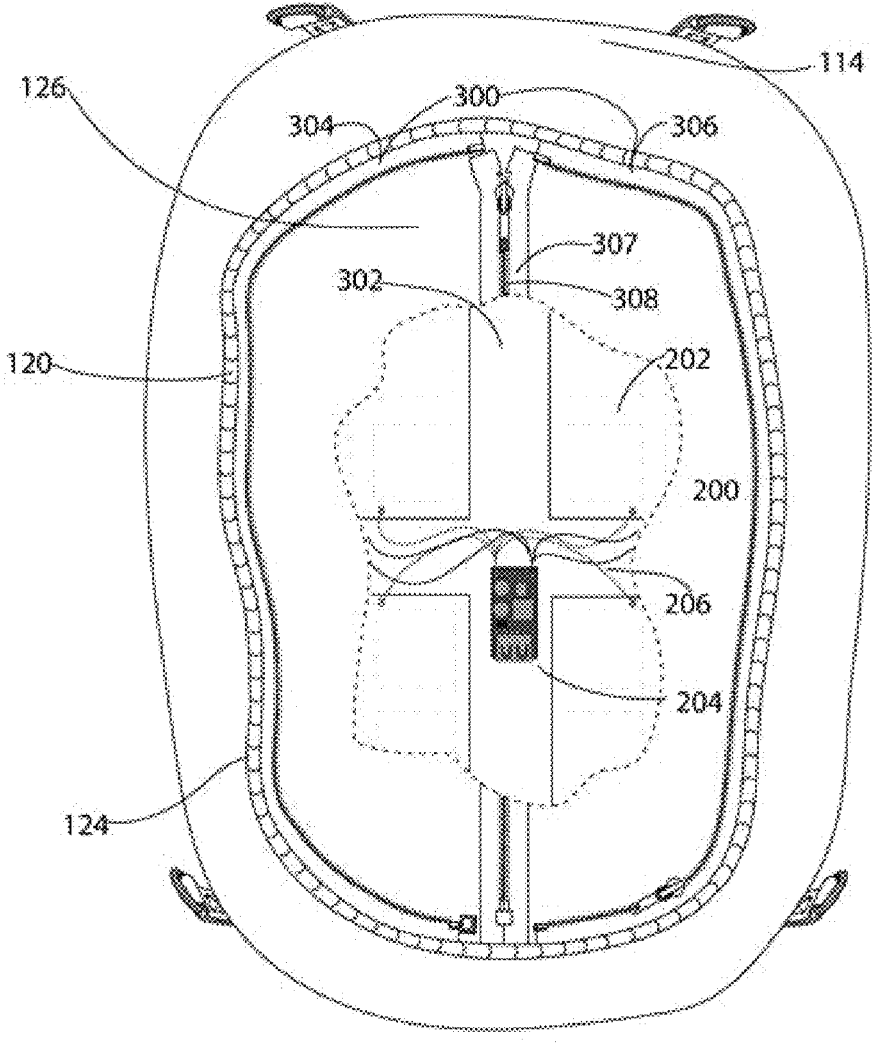
FIG. 13 shows the electrical assemblies shown in FIG. 12A integrated into the backpack cover.

In the first step, waterproof fabric is cut into pieces that will be formed into an internal layer 300 and an external layer 302 of the shell 110. FIG. 13 shows a view in the cavity 126 of the backpack cover 100. The internal layer 300 and the external layer 302 can be seen in FIG. 13. The external layer 302 is to be positioned on top of the internal layer 300. The internal layer 300 is preferably made of two pieces 304, 306. The external layer 302 may be made of one piece, so that the shell 110 would bear more weight. The internal layer 300 and the external layer 302 may have the same shape or at least corresponding shapes such that they fit together and form the shell 110 with the cavity 126. Preferably, the external layer 302 is slightly smaller than the internal layer 300, about a quarter inch around the edges. This provides a space between the internal layer 300 and external layer 302 when they are connected together and enables the external layer 302 to bear more weight. For both layers, waterproof fabric, such as polyurethane (PU) coated nylon ripstop may be used.

In the second step, a rectangular shape slightly smaller than the size of the solar panel 202 is cut out from the external layer 302. A heat welding compound is applied to an inner side of the external layer 302, around the edges to where the solar panel 202 will be placed on. Then, the edges of the solar panel 202 are placed under the welding compound so that the welding compound is between solar panel 202 and the external layer 302. In this step, an additional layer of fabric may be placed between the solar panel 202 and the external layer 302 of the fabric to further strengthen and waterproof the area. The additional fabric may also prevent sharp corners on the solar panel 202 from ripping the external layer 302. This additional fabric, like the waterproof fabric formed into an internal layer 300 and an external layer 302, may be waterproof, durable, tear-resistant, and light weight. Any suitable material, such as polyurethane coated nylon ripstop may be used. The additional fabric may have a rectangular shape or any other suitable shape. Further, the additional fabric may be sized to such that is underneath the solar panel 202 and have a geometry that corresponds to the geometry of the solar panel 202. For example, where the solar panel 202 is rectangular, the additional fabric is rectangular. In addition, the additional fabric has an area that is the same or greater than that of the solar panel 202. Where the solar panel 202 is rectangular, for example, the solar panel 202 has a length and width. Likewise, the additional fabric may have a length and width with the length being the same or greater length as the solar panel 202 and the width being the same or greater than the width of the solar panel 202.

In the third step, the external layer 302 is sewn through or around solar panel 202 and the welding compound.

In the fourth step, the seam between the solar panel 202 and the external layer 302 is heat welded. Any suitable method may be used in this step including a hot air welding machine or a hot press machine, such as a platen sealer.

In the fifth step, the solar panel 202 is wired into a desirable circuit. Wires can be heat welded with a scrap fabric or glued to the external layer 302. The voltage converter 204 may be fastened to the external layer in the same fashion.

In the sixth step, two pieces of the internal layer 304, 306 are brought together and a tape 307 of a zipper 308 is attached to one side of each piece of fabric 304, 306. This part of the internal layer 300 is configured to lay below the mid-section of the front 112 of the backpack cover 100, so that when the zipper 308 opens, the solar charging assembly 200 attached to the external layer 302 is exposed. The tape 307 of the zipper 308 may be added to the internal layer 300 using reasonable measures such as sewing using a fabric, and additionally heat welding. Any suitable fabric may be used, and one example of such suitable fabric is nylon webbing. The same sides of each piece of the internal layer 304, 306 will be connected by sowing and/or heat welding.

In the seventh step, the fabric straps 145 of the fasteners 140 are attached to the internal layer 300 using reasonable measure such sewing using a spare piece of fabric, and additionally heat welding. Any suitable fabric may be used, and one example of such suitable fabric is nylon webbing. The fasteners 140 are to be positioned on the top portion 116 and bottom portion 118 of the backpack cover 100.

In the eighth step, the external layer 302 and the internal layer 300 is aligned on top of each other and attached around a perimeter of both layers 302, 300. The edge of the exterior layer 302 will be folded and the edge of the interior layer 300 will be placed between the fold. Two layers will be sewn, and heat welded together where it is folded, creating the opening 120 in the back 114 of the backpack cover 100. Enough space between the fold will be left out to insert the elastic band 124 or other type of string to close the opening.

In the ninth step, the elastic band 124 or other type of string is pushed through the fold created in step eight and fastened together at both ends of the fold by forming a loop. Then both ends of the fold will be sewn and heat welded to close.

Although this invention has been described with respect to certain specific exemplary embodiments, many additional modifications and variations will be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

What is claimed is:

1. A method of attaching a solar panel to a piece of fabric, the method comprising:

applying a heat welding compound to at least one of an edge of a piece of fabric and an attachment section of a solar panel;

placing, after applying the heat welding compound, an additional layer of fabric between the piece of fabric and the solar panel;

placing the attachment section of the solar panel against the piece of fabric with the heat welding compound sandwiched between the attachment section and the edge of the piece of fabric;

sewing through the edge of the piece of fabric to attach the solar panel to the piece of fabric; and applying heat to weld the attachment section of a solar panel and the edge of the piece of fabric, wherein the solar panel has a shape defined by a length and a width, and wherein the additional layer of fabric has a shape defined by a length and a width, the length of the additional layer of fabric being the same or greater than the length of the solar panel, the width of the additional layer of fabric being the same or greater than the width of the solar panel.

2. The method according to claim 1, wherein the shape of the solar panel and the shape of the additional layer of fabric are both rectangular.

3. The method according to claim 1, wherein the heat is applied for welding using a hot air welding machine or a hot press machine.

4. The method according to claim 1, further comprising:

connecting the solar panel to a voltage converter; and connecting the voltage converter to an output.

5. The method according to claim 4, connecting the voltage converter to an inner side of the piece of fabric.

6. A method of manufacturing a backpack cover, the method comprising:

providing a solar panel having an attachment section;

providing a piece of fabric to form an external layer, the external layer having an opening formed therein and an inner surface, the opening being defined by at least one edge;

applying a heat welding compound to at least one of an attachment section of a solar panel or the inner surface of the external layer around the at least one edge of the opening;

placing, after applying the heat welding compound, an additional piece of fabric between the external layer and the solar panel;

placing the attachment section of the solar panel with the heat welding compound between the attachment section of the solar panel and the inner surface of the external layer;

sewing through the external layer to attach the solar panel to the external layer;

applying heat to weld the solar panel to the external layer; and attaching at least one other piece of fabric as an internal layer to an inner-surface side of the external layer, wherein the solar panel has a shape defined by a length and a width, and wherein the additional layer of fabric has a shape defined by a length and a width, the length of the additional layer of fabric being the same or greater than the length of the solar panel, the width of the additional layer of fabric being the same or greater than the width of the solar panel.

7. The method according to claim 6, wherein attaching the internal layer comprises:

aligning a perimeter of the external layer and a perimeter of the internal layer;

folding an edge of the external layer, and placing the perimeter of the internal layer between the fold, thus creating an opening; and attaching a string to the perimeter of the internal layer through the opening such that the string is able to move to throughout the fold.

8. The method according to claim 7, further comprising attaching a spring-loaded cord lock or a plastic twist lock to the string.

9. The method according to claim 6, wherein the shape of the solar panel and the shape of the additional layer of fabric are both rectangular.

10. The method according to claim 6, further comprising attaching at least one additional solar panel to the external layer, wherein attaching the at least one additional solar panel includes:

providing at least one additional opening formed in the external layer, the at least one additional opening being defined by a corresponding at least one edge;

applying a heat welding compound to an attachment section of the at least one additional solar panel or the inner surface of the external layer around the at least one edge of the at least one additional opening;

placing the attachment section of the at least one additional solar panel with the heat welding compound between the attachment section of the at least one additional solar panel and the inner surface of the external layer;

sewing through the external layer to attach the at least one additional solar panel to the external layer;

applying heat to weld the at least one additional solar panel to the external layer; and connecting the solar panel and the at least one additional solar panel to each other by wiring.

11. The method according to claim 10, wherein the solar panel and the at least one additional solar panel are connected in parallel.

12. The method according to claim 10, wherein the solar panel and the at least one additional solar panel are connected in series.

13. The method according to claim 10, further comprising connecting the solar panel and the at least one additional solar panel to a switch controller configured to change wiring configuration of the solar panel and the at least one additional solar panel.

14. The method according to claim 10, further comprising attaching a solar charging assembly to the external layer, wherein attaching the solar charging assembly includes a voltage converter and an electrical output capable of charging external devices, the voltage converter being connected to the electrical output and to the solar panel and the at least one additional solar panel by the wiring.

15. The method according to claim 6, further comprising attaching at least one fastener to the external layer, the at least one fastener being capable of connecting to a carrying strap.

16. The method according to claim 6, wherein the piece of fabric forming the external layer is a waterproof fabric.

17. The method according to claim 6, wherein the heat welding compound is welded using a hot air welding machine or a hot press machine.

18. The method according to claim 6, further comprising:

forming an opening in the internal layer, wherein the opening is defined by a first edge and a second edge;

aligning the first edge of the opening next to the second edge of the opening; and attaching a zipper tape to both the first edge of the opening and the second edge of the opening.

* * * * *